United States Patent
Agrawal et al.

[11] Patent Number: 5,664,171
[45] Date of Patent: Sep. 2, 1997

[54] SYSTEM AND METHOD FOR QUERY OPTIMIZATION USING QUANTILE VALUES OF A LARGE UNORDERED DATA SET

[75] Inventors: Rakesh Agrawal; Arun Narasimha Swami, both of San Jose, Calif.

[73] Assignee: International Business Machines Corporation, Armonk, N.Y.

[21] Appl. No.: 227,428

[22] Filed: Apr. 14, 1994

[51] Int. Cl.$^6$ .............................. G06F 17/30; G06F 15/00
[52] U.S. Cl. .......................... 395/602; 364/148; 395/601; 395/603; 395/604
[58] Field of Search ........................... 395/600; 364/574, 364/300

[56] References Cited

U.S. PATENT DOCUMENTS

| | | | |
|---|---|---|---|
| 4,379,948 | 4/1983 | Ney et al. | 179/1 |
| 4,530,076 | 7/1985 | Dwyer | 367/135 |
| 4,817,158 | 3/1989 | Picheny | 381/47 |
| 4,829,427 | 5/1989 | Green | 364/300 |
| 5,018,088 | 5/1991 | Higbie | 364/574 |
| 5,091,967 | 2/1992 | Ohsawa | 382/22 |
| 5,105,469 | 4/1992 | MacDonald et al. | 382/17 |
| 5,345,585 | 9/1994 | Iyer et al. | 395/600 |
| 5,379,419 | 1/1995 | Heffernan et al. | 395/600 |

OTHER PUBLICATIONS

J.I. Munro & M.S. Peterson, "Selection & Sorting with Limited Storage", North–Holland Publishing Company, Mar. 1980.
Raj Jain & Imrich Chlamtac, "The P$^2$ Algorithm for Dynamic Calculation of Quantiles & Histograms Without Storing Observation", vol. 28, Oct. 1985.
"Mining Association Rules Between Sets of Items in Large Databases", R. Agrawal et al., ACM–089791–592, May 1993, pp. 207–216.
"Equidepth Partitioning of a Data Set Based on Finding Its Medians", A.P. Gurajada et al., IEEE THO355, Aug. 1991, pp. 92–101.
"The P$^2$ Algorithm for Dynamic Calculation of Quantiles and Histograms Without Storing Observations", R. Jain et al., Communications of the ACM, vol. 28, No. 10, Oct. 1985, pp. 1076–1085.
"Equi–Depth Histograms for Estimating Selectivity Factors for Multi–Dimensional Queries", M. Muralikrishna, ACM 0–89791–268, Mar. 1988, pp. 28–36.
"Accurate Estimation of the Number of Tuples Satisfying a Condition", G. Piatetsky–Shapiro, ACM 0–89791–198, Aug. 1984, pp. 256–276.
"Quantile Estimation from Grouped Data: the Cell Midpoint", B.W. Schmeiser et al., Comm. Statist.–Simula. Computa., B6(3), 1977, pp. 221–234.
"The Generation of Order Statistics in Digital Computer Simulation: A Survey", B.W. Schmeiser, pp. 137–140, no date.
"Selection and Sorting with Limited Storage", J.I. Munro et al., Theoretical Computer Science 12, North–Holland Publishing Company, 1980, pp. 315–323.

*Primary Examiner*—Thomas G. Black
*Assistant Examiner*—Cheryl R. Lewis
*Attorney, Agent, or Firm*—Baker, Maxham, Jester & Meador

[57] ABSTRACT

A database management system determines, in a single pass over an unordered database, the quantile information. The system sequentially compares each tuple in the data set to a test value, and then selectively inserts the tuple in a test set having a cardinality less than the cardinality of the data set based upon the comparison. The system next uses the quantile information to estimate the number of tuples in the database which satisfy a user-defined predicate to generate an efficient query plan.

12 Claims, 2 Drawing Sheets

SYSTEM AND METHOD FOR QUERY OPTIMIZATION USING QUANTILE VALUES OF A LARGE UNORDERED DATA SET

BACKGROUND OF THE INVENTION

1. Field of the Invention

The present invention relates generally to computer database systems, and more particularly to systems and methods for database query optimization.

2. Description of the Related Art

Computer-implemented database management systems have been provided for managing data storage and retrieval in response to user commands. Thus, a user may request that a computer return all stored records, referred to as tuples, that contain one or more fields, i.e., attributes, which satisfy one or more corresponding user-defined conditions, known as predicates, and the database management system must determine how best to deliver the requested records. As one example, the user may request from a personnel database a listing of all personnel records of people who are older than a certain age and who have an income above a certain amount. Such a request is referred to as a query, and it is the function of the database management system to respond to the query quickly and efficiently in returning the requested data.

In a database management system of the compiling kind, an application program containing database queries is processed for compilation prior to run time. During compilation, database queries are passed to the database management system for compilation by a system bind component. The bind component, essentially a database management system compiler, translates the queries contained in the application program into machine language.

Because most users do not input queries in formats that suggest the most efficient way for the database management system to address the query, a database compiler component referred to as a query optimizer typically transforms a query input by the user into an equivalent query that can be computed more efficiently. This is done at compile time, in advance of execution.

More particularly, to enable the computer to process a user's query, the query optimizer of the database management system first transforms the user's request into an equivalent machine-readable form that is commonly based on relational algebra.

Having determined the most efficient relational algebraic expression of the query, the query optimizer next determines a computationally efficient strategy for executing the expression to retrieve the requested data. The strategy is commonly called a "query plan". The query optimizer usually considers several query plans and evaluates the computational cost of each to determine which query plan is most efficient. The query optimizer then selects the query plan which entails the least computational cost to execute. Because the difference in computational time between an efficient query plan and an inefficient query plan can be great, it is worthwhile for the query optimizer to conduct the evaluations discussed above prior to accessing the storage media to respond to a user request.

To evaluate the likely cost of a particular query plan as measured in computational time, the query optimizer relies on statistics which relate to the number of tuples containing attributes that satisfy the user-defined predicate. An important statistic used by query optimizers is quantile information which relates to the number of tuples satisfying a predicate. Quantile information is also useful in database partitioning during parallel processing, and in database mining.

Relatedly, the p% quantile of a set of data values is defined as the value below which p percent of the data values lie. As an example, consider an employee database in which one of the fields is salary. Suppose that 90% of employees have a salary less than $85,000. Then $85,000 is the 90%-quantile for the salary values in the employee database.

Consider the user's query: "Find all employees whose salary is between $50,000 and $60,000". Let the 50%-quantile be $49,000 and the 60%-quantile be $62,000. If there were 100,000 employee records in the database then the query optimizer can be sure that the answer will have at most 10,000 records (10% of total employees). Manifestly, such information is important for generating good query plans.

When estimating a p%-quantile, either a single value is provided as the answer or, more often, two values are provided as the bounds within which the true p%-quantile is guaranteed to lie. In order to obtain these quantile values, the optimizer could read into memory all the information and manipulate the data in memory, and obtain the results. But this solution has the drawback of needing a memory at least the size of the database itself. This is impractical for very large databases containing millions of data records. The query optimizer must deal with the constraint of limited memory, i.e., a memory size which is substantially less than the size of the entire database such that the entire database cannot be read into memory all at once. Thus, it is important to determine quantile values with limited memory.

One method that can be used to obtain quantile values for tuples satisfying predicates is simply to sort the data in the database and then make a pass over the sorted data to find the desired quantiles. Unfortunately, such a sorting procedure must be performed on the data for each attribute for which quantile values are desired, making this method computationally expensive. Also, each sorting step requires multiple passes over the database, particularly when the database is very large compared to available memory.

As an alternative, random samples of the database can be obtained, sorted, and quantiles estimated, but such a method cannot deliver an absolute error bound on the estimated quantiles. In yet another alternative, several passes can be made over unsorted data to find quantiles, but this procedure is also computationally expensive.

Accordingly, it is an object of the present invention to provide an apparatus and method in a query optimizer for estimating the number of tuples in an unsorted database which satisfy a predicate using the quantile information obtained in only one pass over the data.

Another object of the present invention is to provide an apparatus and method for estimating the number of tuples in an unsorted database that satisfy a predicate which produces guaranteed and tight bounds for the number of estimated tuples.

Still another object of the present invention is to provide an apparatus and method for estimating the number of tuples in an unsorted database that satisfy a predicate which is easy to use and efficient in terms of the computational space required.

SUMMARY OF THE INVENTION

A data system requires a computer, a storage system with real memory, and one or more input devices electrically connected to the computer for enabling the input of a user request for data satisfying a predetermined condition. Also, the system includes a database stored in the storage system which is accessible by the computer for holding one or more sets of data records, as well as a database management system that receives, processes, and provides responses to the user requests and maintains the database. The database management system includes a compiler for translating query statements into machine-readable form. A query optimizer is included in the database management system compiler to generate an efficient query plan for retrieving records from the database in response to a request for data.

To support query optimization, first the quantile values are generated. As part of the quantile value generation, provision is made for sequentially comparing each tuple in a data set to a test value in a single pass over the tuples of the set. For each tuple, based upon the comparison, the invention selectively inserts the tuple in a test set that has a cardinality less than the cardinality of the data set. The test set is accessed to generate the quantile value.

In one embodiment, the tuples are records and the test value is an element of a record in the test set. Additionally, the invention preferably further includes means for selectively discarding a record from the test set in response to the comparison.

In another aspect of the present invention, the number of records in a data set that satisfy a prespecified condition are estimated by using the quantile information obtained earlier.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
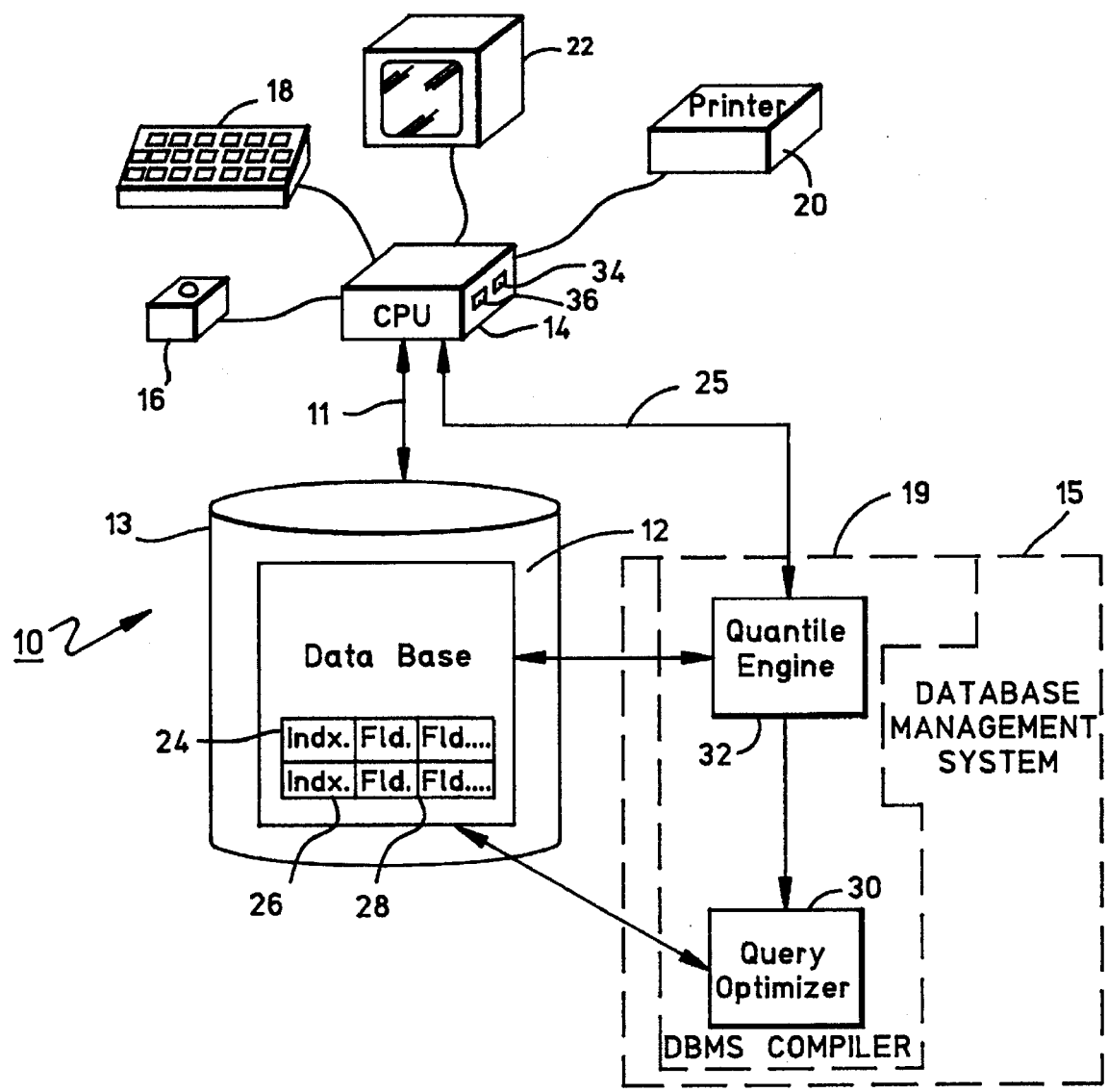
FIG. 1 is a schematic diagram showing the system of the present invention for estimating stored records which satisfy a predetermined condition for database query optimization.

Referring initially to FIG. 1, a system is shown, generally designated 10, for optimizing data retrieval over data path 11 from a database 12, which may reside, for example, in one or more storage devices such as the device 13. As shown, the system 10 includes a central processing unit (CPU) 14, e.g., an IBM computer. The CPU 14 is electrically connected to one or more input devices, e.g., a mouse 16 and a keyboard 18, which can be manipulated by a user of the system 10 to generate requests for data in the database 12. If desired, the system 10 can include peripheral components such as a printer 20 and a video display unit 22.

A database management system (DBMS) 15 of the compiling kind executes in the CPU 14, receiving user requests which contain database queries. The DBMS 15 processes the queries, providing access to the database 12. The DBMS 15 includes a compiler 19, which may also be referred to as a "bind" component.

FIG. 1 shows that the storage device containing the database 12 electronically stores a plurality of data records 24, commonly referred to as tuples. Each data record 24 includes an index element 26 and a plurality of field elements 28, commonly referred to as attributes. For example, each data record 24 may contain personnel information, with the fields 28 containing values for attributes of the person such as age, physical characteristics, financial status, employment history, and so on.

To retrieve information from the database 12, a user manipulates the mouse 16 or keyboard 18 as appropriate to generate a data retrieval request in the form of a query. Typically, this query will include a requirement that the data to be retrieved is limited to only those records 24 which satisfy one or more predetermined, user-defined predicates, i.e., conditions. For example, the user may want to retrieve the records 24 that contain data only on those people who are older than fifty years of age and who weigh more than two hundred pounds.

Typically, a query is executed in the context of an application program containing database queries. Prior to execution of the application program, it is compiled. During compilation, the queries in the application program are removed and replaced with calls to routines which are bound to the application program. These routines are optimized machine language procedures produced by compilation of the application program queries by the DBMS compiler 19.

During compilation, the CPU 14 receives the application program and forwards the query statements over an information path 25 to a query optimizer 30 that is included in the DBMS compiler 19 for determining how to efficiently retrieve the requested data, based upon the user-defined predicates. As but one example, the query optimizer 30 can be one of the query optimizers discussed by Jarke et al. in "Query Optimization in Database Systems", 16 ACM COMPUTING SURVEYS 2 (June 1984).

As intended by the present invention, the DBMS compiler 19 includes a quantile engine 32 coupled to the query optimizer 30. In accordance with the method described below, the query optimizer 30 estimates the number of records 24 satisfying the predetermined predicates based in part upon quantile values which are generated by the quantile engine 32.

In other words, the quantile engine 32 generates quantile values for the number of tuples satisfying a predicate, and these quantile values are used by the query optimizer 30 to develop an efficient query plan for retrieving the requested data from the database 12. It is to be understood that the components such as the query optimizer 30 and quantile engine 32 can be included in DBMS compiler software contained in an appropriate electronic data storage system that includes, e.g., a hard disk drive 34 and optical disk drive 36 that are coupled conventionally to the CPU 14.

As one example of the type of database query which can be processed by the present invention, suppose that each record 24 shown in FIG. 1 contains the name of a person, and that the fields 28 of each record 24 contain attributes of that person, e.g., age, height, weight, income, etc. Suppose further that a user wants the CPU 14 to return the records for all employees who are older than fifty years, who weigh more than one hundred fifty pounds, and who have an annual income of between twenty thousand dollars and forty thousand dollars. This query can be represented by the query optimizer 30 as:

((PEOPLE.Age>50) AND (PEOPLE.Weight>150) AND (20000≦PEOPLE.Income≦40000)).

To evaluate the best query plan, the query optimizer 30 preferably estimates the number of records 24 that satisfy each of the three above-mentioned predicates, i.e., conditions. In other words, the query optimizer must estimate the number of records 24 pertaining to people older than fifty years, the number of records 24 pertaining to people who weight more than one hundred fifty pounds, and the number of records 24 pertaining to people who have an annual income within the desired bounds.

By having available to it the fact that, for example, the 60% quantile for age is 47 years and the 70% quantile for age is 54 years, the query optimizer 30 can infer that between 30% and 40% of the records 24 satisfy the age condition. Similarly, by having available to it quantile estimates for the other two conditions, the query optimizer 30 can infer how many records 24 satisfy all three conditions, and then use this information to evaluate the efficiencies of competing prospective query plans. It is the function of the quantile engine 32 to provide such quantile estimates to the query optimizer 30, using the process described below. The operation of the query optimizer 30 which employs the estimates in plan evaluation is, however, conventional.

As recognized by the present invention, the quantile engine 32 can obtain upper and lower bounds for a quantile value "p" for the tuples in an unordered database 12, denoted X, where $X=\{x_i\}$ and has a cardinality of $|X|$ and a target value $\tau=p*|X|$ in a single pass over the data set X by solving two of the below four problems. Specifically, a lower bound value for the quantile "p" can be obtained by finding a value $v_{96}$ that satisfies the so-called "at least—less than or equal to" problem represented as:

$$|X_\tau| \geq \tau, \text{ where } X_\tau = \{x_i | x_i \epsilon X \text{ and } x_i \leq v_\tau\} \quad (1)$$

Similarly, an upper bound value for the quantile "p" can be obtained by finding a value $v_\tau$ that satisfies the so-called "at most—less than" problem represented as:

$$|X_\tau| < \tau, \text{ where } X_\tau = \{x_i | x_i \epsilon X \text{ and } x_i < v_\tau\} \quad (2)$$

If desired, the above problems cart be solved by negating values in X and finding a value $v_\tau$ that satisfies the below-represented "at least—greater than or equal to" and "at most—greater than" problems, respectively:

$$|X_\tau| \geq \tau, \text{ where } X_\tau = \{x_i | x_i \epsilon X \text{ and } x_i \geq v_\tau\} \quad (3)$$

$$|X_\tau| < \tau, \text{ where } X_\tau = \{x_i | x_i \epsilon X \text{ and } x_i > v_\tau\} \quad (4)$$

For clarity of disclosure, the below-disclosed steps are focussed on finding a single bound for a single quantile. However, the procedure is immediately applicable to finding bounds for multiple quantiles.

Figure 2:
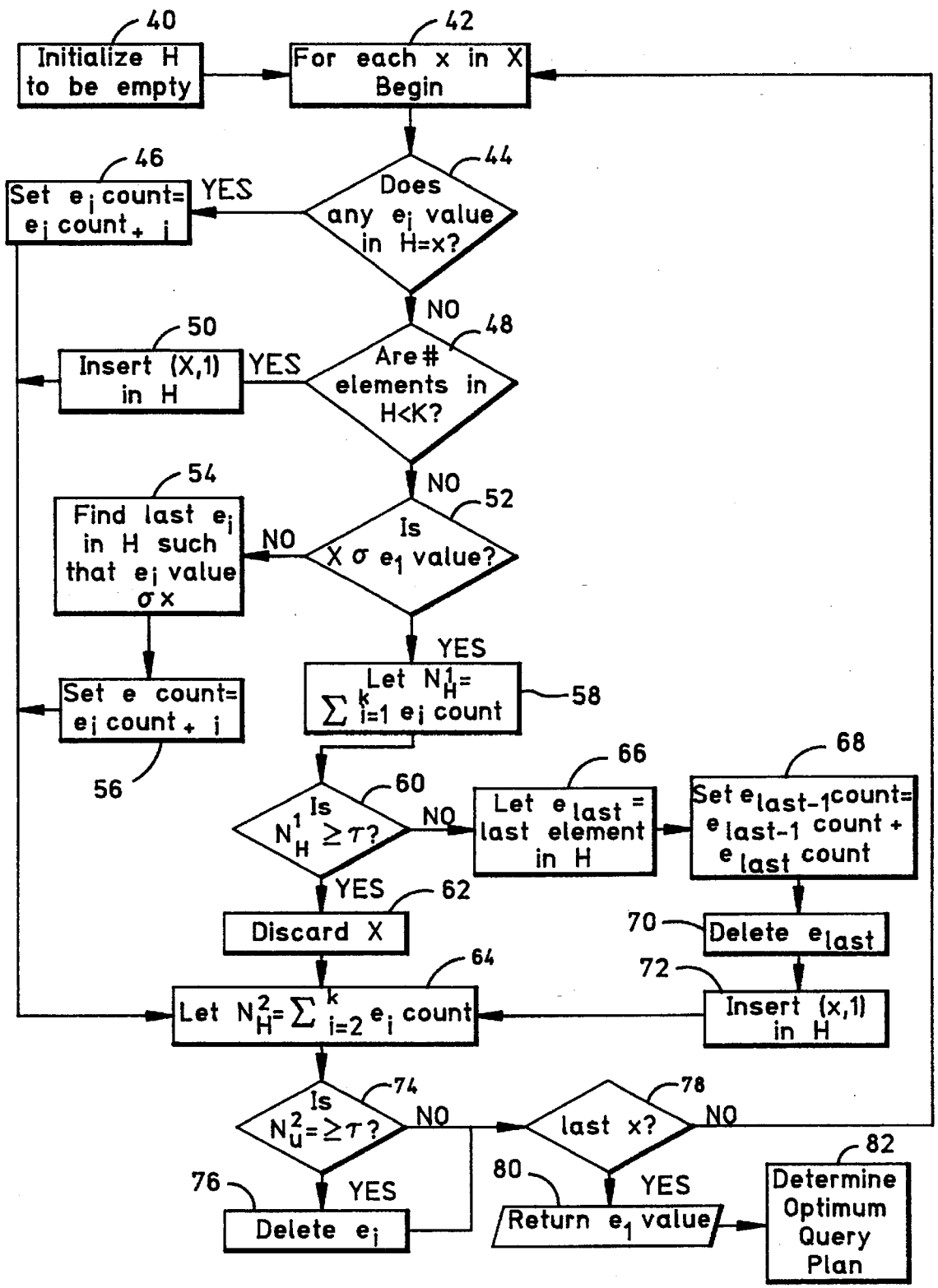
FIG. 2 is a flow chart of the method for obtaining the quantile information.

Now referring to FIG. 2, the method of the present invention can best be seen. FIG. 2 is a flow diagram which illustrates a process executed by the quantile engine 32 to generate quantile information used by the query optimizer 30 during compilation, prior to execution of any database queries. Before any optimization is done, the quantile engine makes one pass over the data in order to obtain the quantiles. This quantile finding is done once when a query is optimized. The optimizer while optimizing a query needs to estimate the number of records that will be in the result of the query. In order to perform this estimation, the optimizer uses the quantile information that has already been generated by the quantile engine. Thus, the quantile information is obtained once by the quantile engine and is used subsequently in the optimization of many different queries.

At block 40, the quantile engine 32 generates a test set H which is art ordered list of k elements $e_1, e_2, \ldots e_k$, wherein $k \geq 2$ and represents the maximum cardinality of H, and the test set H is initialized to be empty and each element corresponds to a data set tuple. In accordance with the present invention, $|H| << |X|$. Each element $e_i$ of H is a (value, count) pair represented as $e_i$.value and $e_i$.count, respectively.

From block 40, the quantile engine 32 moves to block 42, wherein the engine 32 begins the following steps for each record in the database X. The steps are performed with reference to a test value in the form of at least one element (element x). For example, each element x may be a field 28 which represents a person's age in a personnel record 24 that corresponds to that person. At decision block 44, the engine 32 determines whether any $e_i$.value in the test set H equals the element x under test. If so, the engine moves to block 46, wherein the $e_i$.count that corresponds to the $e_i$.value which equals the element x under test is incremented by one.

On the other hand, if no $e_i$.value in the test set H equals the element x under test, the engine moves to decision block 48, wherein the engine 32 determines whether the test set H contains less than the maximum number of k elements. If so, the engine 32 moves to block 50, wherein the engine 32 inserts the element x with count of 1 under test into the test set H at its position in order in the test set H. Otherwise, the engine 32 moves to decision block 52.

At decision block 52, the engine 32 compares x to the value of the first element in H. The comparison operator, designated herein by $\theta$, is chosen from among the operators that include greater than (>), less than (<), greater than or equal to ($\geq$), and less than or equal to ($\geq$), depending upon which of the above-disclosed problems (1)–(4) is being solved. Accordingly, decision block 52 may be implemented as a comparator for comparing one of the attributes of each personnel record 24 in the database 12 (i.e., each element x in X) to a test value.

If the test at decision block 52 is false, the engine 32 moves to block 54, wherein the engine 32 determines the last $e_i$ in the test set H such that its associated value has the predetermined relationship ($\theta$) to the element x under test. Then, the engine 32 moves to block 56 and increments the count of the element $e_i$ identified in block 54 by one.

In contrast, if the test at decision block 52 is true, the engine 32 moves to block 58, wherein the engine 32 sets a first summing variable $N_H^1$ equal to the sum of the counts of the elements $e_i$ in the test set H. Next, the engine 32 moves from block 58 to decision block 60, wherein the engine 32 determines whether the first summing variable $N_H^1$ is greater than or equal to the target value $\tau$. If so, the engine 32 moves to block 62, wherein the element x under test is discarded. From block 62, the engine 32 moves to block 64.

If, on the other hand, the first summing variable $N_H^1$ is not greater than or equal to the target value $\tau$ at block 60, the engine 32 moves to block 66, wherein the engine 32 sets a dummy variable $e_{last}$ equal to the last element in the test set H. Next, the engine 32 moves to block 68, wherein the engine 32 increments the count of the second-to-last element ($e_{last-1}$) in the test set H by the count of the last element $e_{last}$ in the test set H. From block 68, the engine 32 moves to block 70, wherein the last element in H is deleted, and then the engine 32 moves to block 72, wherein the element x under test is inserted with count of 1 into the test set H into its position in order in the test set H. Accordingly, the skilled artisan will appreciate that the blocks 60–72 essentially define a means for selectively inserting the record 24 under test in the test set H.

From blocks 46, 50, 56, 62, and 72, the engine 32 moves to block 64, wherein the engine 32 sets a second summing variable $N_H^2$ equal to the sum of the counts of the elements $e_i$ in the test set H, less the count of the first element $e_1$. Then, the engine 32 moves to decision block 74, wherein the engine 32 determines whether the second summing variable $N_H^2$ is greater than or equal to the target value τ. If so, the engine 32 moves to block 76, wherein the first element $e_1$ in the test set H is deleted.

From block 76, or from decision block 74 if the engine 32 there determines that the second summing variable $N_H^2$ is not greater than or equal to the target value τ, the engine 32 moves to decision block 78, wherein the engine 32 determines whether the value x under test is the last element in the database X. If it isn't, the engine 32 returns to block 42 to repeat the process for the next element x in the database X. Otherwise, the engine 32 moves to output block 80 and returns the value of the first element $e_1$ in the test set H. Thus, the output block 80 defines a quantile value generator which accesses the test set H to generate a quantile value of the record 24 corresponding to the $p^{th}$ quantile of the database 12. Stated differently, the output block 80 generates a quantile value of the number of records 24 in the database 12 satisfying the user-defined condition.

At block 82, the quantile value is passed to the query optimizer for determining an optimum query plan based upon the quantile value generated by the quantile engine at compile time in a single pas over the data.

It is to be understood that both an upper bound value and a lower bound value for the tuple in the $p^{th}$ quantile can be obtained by performing the above-disclosed steps to solve both of the above-listed problems (1) and (2) in a single pass over the data of the database 12 (keeping a separate list for each problem). Stated differently, the steps shown in FIG. 2 can be performed simultaneously for more than one value of the operator θ.

Also, both problems can be solved for a plurality of quantiles, again by performing the above-disclosed steps for each quantile desired and keeping a separate list for each. Stated differently, the steps shown in FIG. 2 can be performed simultaneously for more than one value of the target value τ.

We have discovered that with the above-disclosed process, when using a test set H having a cardinality of 500, the relative error in returned quantile bounds as a percentage of the relation size is less than about one percent (1%) and one and one-half percent (1.5%) when X is generated randomly according to a uniform distribution and a Zipfian distribution, respectively. The returned quantile bounds are exact when X is ordered. Thus, the present invention returns highly accurate quantile bounds in a single pass over the data of an unordered database using a test set having a cardinality much less than the cardinality of the database. Also, the true quantile is guaranteed to lie within the upper and lower bounds.

In addition to the above-disclosed steps, if desired, after every "n" elements x in the database X have been tested as disclosed above, the count of the second-to-last element in the test set H can be incremented by the count of the last element in the test set H, and then the last element of the test set H deleted. The value "n" is a heuristically chosen integer, e.g., one.

Alternatively, if an element x under test has incremented the count of the first element in the test set H, and that count is greater than the product of a value "n" and the square of the second summing variable disclosed above, the count of the second-to-last element in the test set H can be incremented by the count of the last element in the test set H, and then the last element of the test set H deleted. The value "n" is a heuristically chosen integer, e.g., one.

As yet another alternative, if an element x under test has incremented the count of the first element in the test set H, and that count is greater than or equal to the product of a value "n" and the target value τ, the count of the second-to-last element in the test set H can be incremented by the count of the last element in the test set H, and then the last element of the test set H deleted. The value "n" is a heuristically chosen integer, e.g., one.

Having obtained quantiles using the method described in FIG. 2, an estimate is made of the number of records 24 satisfying the user-defined predicate. This involves determining the quantile values bounding the predicate, taking the difference of the two, and multiplying the difference by the data set cardinality.

While the particular system and method for estimating stored records as herein shown and described in detail is fully capable of achieving the above-stated objects of the invention, it is to be understood that it is illustrative of but one preferred embodiment, that other embodiments may exist that will be obvious to those skilled in the art, and that the scope of the present invention accordingly is to be limited by nothing other than the appended claims.

We claim:

1. A data storage system, comprising:
   a computer;
   one or more input devices electrically connected to the computer for generating a user request for data satisfying a predetermined condition;
   a database accessible by the computer for holding a set of data records; and
   a database management system executable by the computer, the database management system including a compiler, the compiler including:
   a query optimizer for generating a query plan in response to quantiles of the set of data records;
   comparator means in the query optimizer for sequentially comparing the data records in the set of data records to a test value of the condition in a single pass over the set of data records;
   means for selectively inserting a data record in a test set having a cardinality less than the cardinality of the set of data records based upon the comparison and the condition; and
   means for accessing the test set to generate a quantile value in response to a data record in the test set, the quantile value representative of a number of data records in the database satisfying the condition.

2. The system of claim 1, wherein the test value is an element of one of the data records in the test set.

3. The system of claim 2, further comprising means for selectively discarding a data record from the test set in response to the comparison and the condition.

4. The system of claim 3, the database management system further including means for determining upper and lower bounds for a data record satisfying the condition, wherein the data record is between the upper and lower bounds.

5. A method executed by a query optimizer for estimating a number of records containing a data field satisfying a predetermined query condition in a data set having a data set cardinality in a single pass over the records of the set, comprising the steps of:
   generating a test set having a cardinality less than the data set cardinality;
   sequentially comparing each record in the data set to a test value and generating a first value in response thereto;
   generating a second value representative of the condition;
   selectively inserting the record in the test set in response to the first and second values;

determining in said single pass and from a record in the test set a quantile value representing a number of records in the data set which satisfy the condition; and generating a query plan in response to the quantile value.

6. The method of claim 5, wherein the test value is an element of one of the records in the test set.

7. The method of claim 6, further comprising the step of selectively discarding the element from the test set in response to the first and second values.

8. The method of claim 7, further comprising the step of returning upper and lower bounds between which the record lies.

9. An optimizer including a quantile engine for estimating a number of tuples satisfying a condition in a set of tuples having a cardinality in a single pass over the tuples of the set, the quantile engine characterized by:

comparator means for sequentially comparing all tuples in the set of tuples to a test value;

means for selectively inserting a tuple in the set of tuples in a test set having a cardinality less than the cardinality of the set of tuples based upon the comparison and the condition; and means for generating in said single pass a quantile value representative of the number of tuples of the test set satisfying the condition.

10. The optimizer of claim 9, wherein the test value is an element of one of the tuples in the test set.

11. The optimizer of claim 10, further comprising means for selectively discarding the tuple from the test set in response to the quantile value.

12. The optimizer of claim 11, further comprising means for determining upper and lower bounds for the tuple satisfying the condition, wherein the tuple lies between the upper and lower bounds.

* * * * *